Sept. 2, 1952 P. L. REED 2,608,743
MACHINE FOR MAKING ELECTRODE ASSEMBLIES
Filed Feb. 10, 1949 5 Sheets-Sheet 1

INVENTOR.
PRICE L. REED
BY
ATTORNEYS

Sept. 2, 1952 P. L. REED 2,608,743
MACHINE FOR MAKING ELECTRODE ASSEMBLIES
Filed Feb. 10, 1949 5 Sheets-Sheet 2

INVENTOR.
PRICE L. REED
BY
ATTORNEYS.

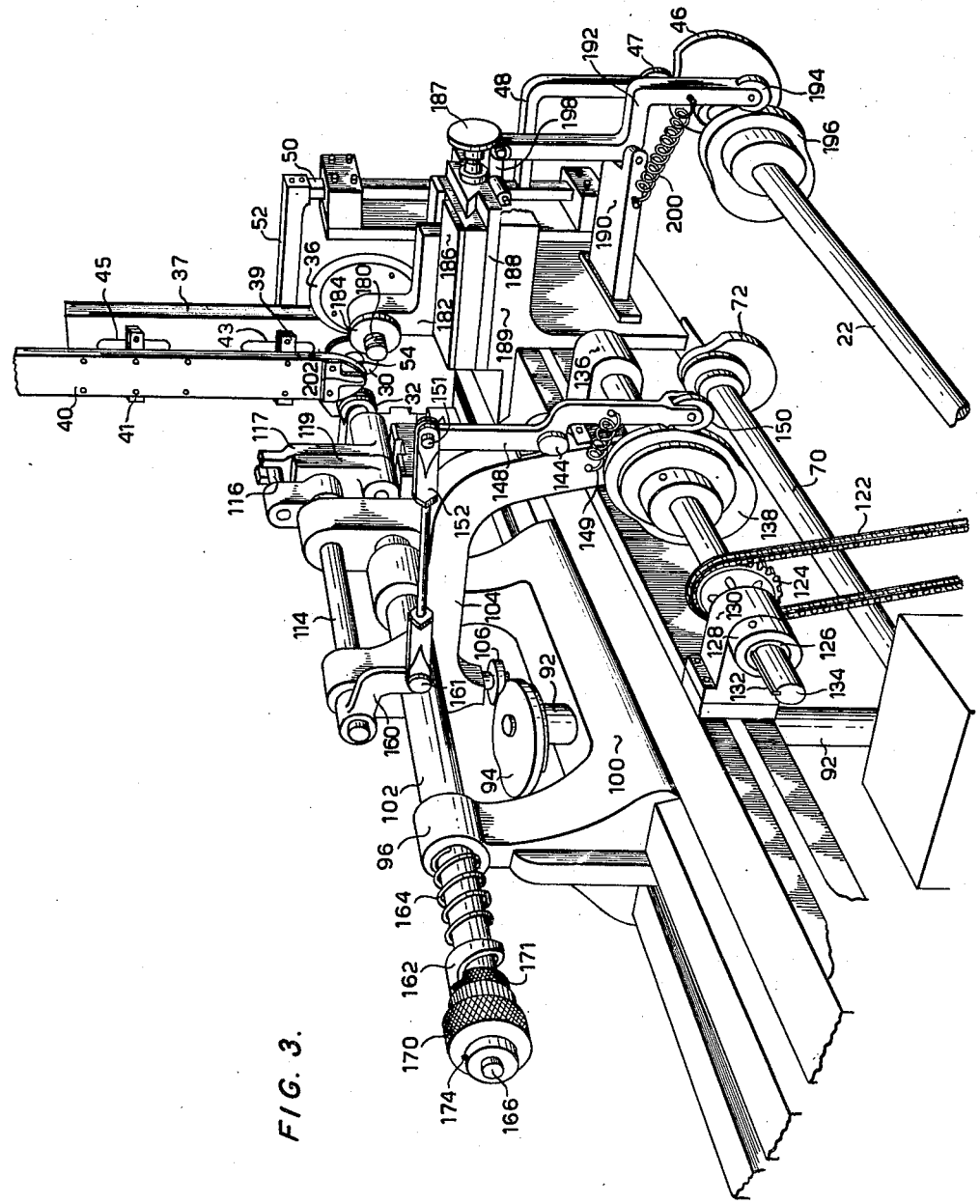

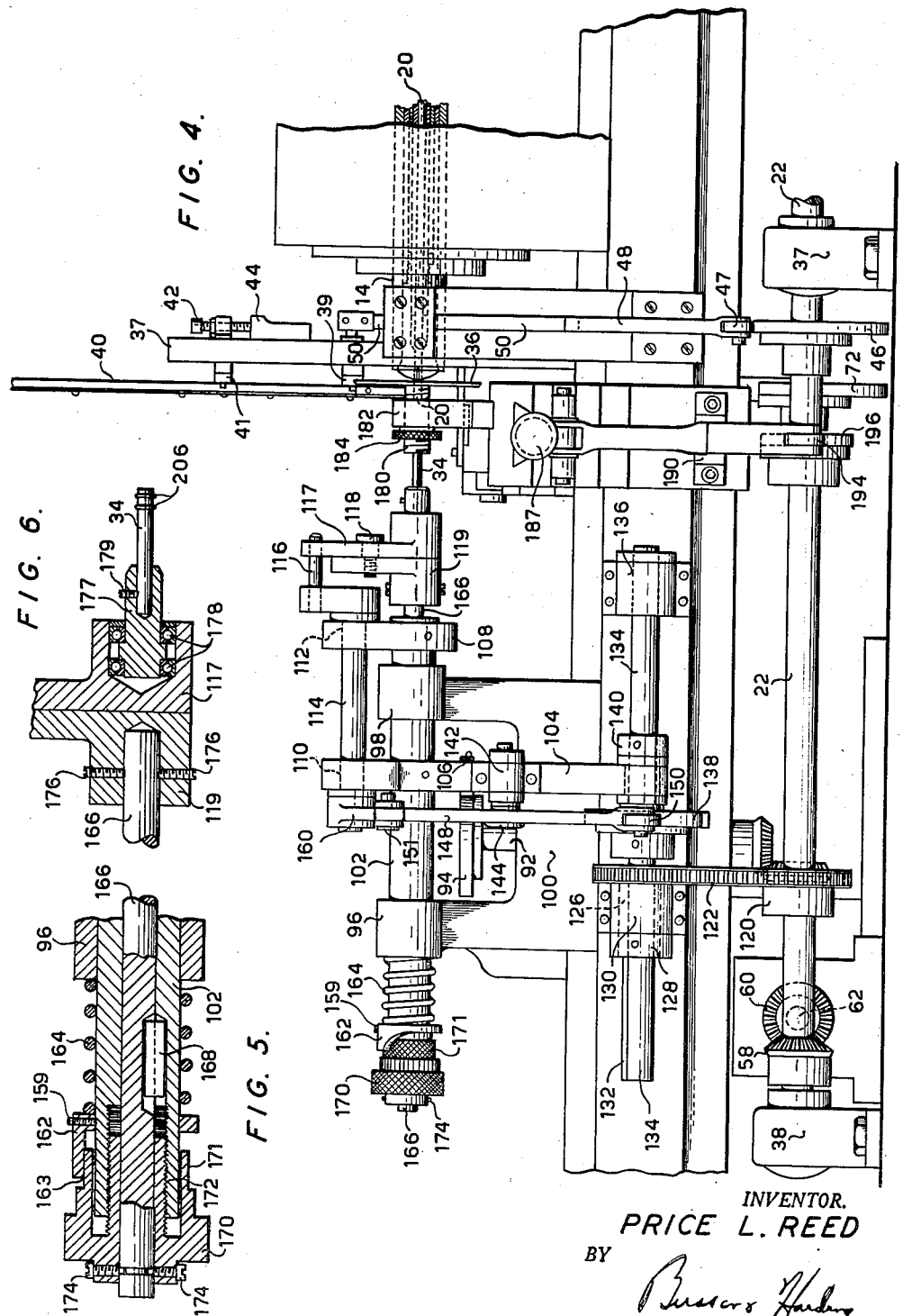

Sept. 2, 1952 P. L. REED 2,608,743
MACHINE FOR MAKING ELECTRODE ASSEMBLIES
Filed Feb. 10, 1949 5 Sheets-Sheet 5
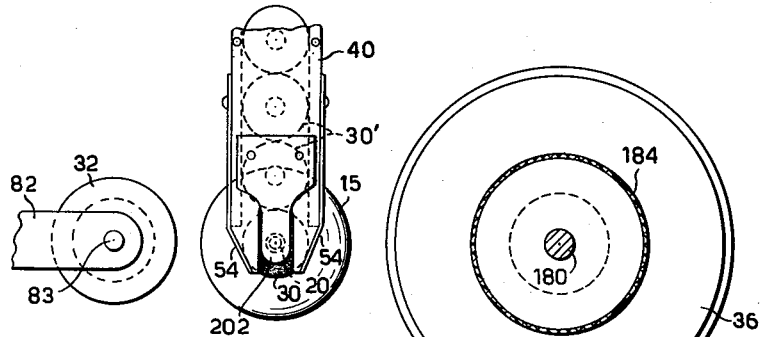
FIG. 7.
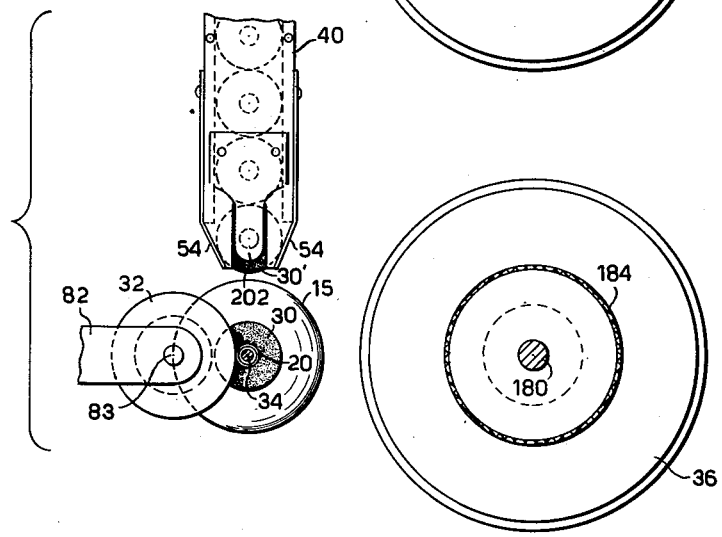
FIG. 8.
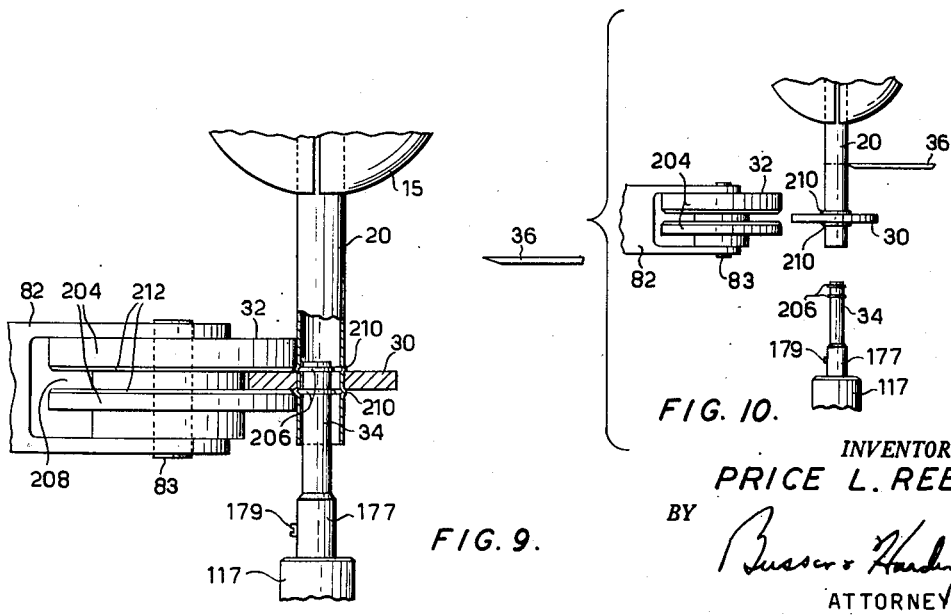
FIG. 9.
FIG. 10.
INVENTOR.
PRICE L. REED
BY
ATTORNEYS Patented Sept. 2, 1952

2,608,743

UNITED STATES PATENT OFFICE 2,608,743

MACHINE FOR MAKING ELECTRODE ASSEMBLIES

Price L. Reed, Royersford, Pa., assignor to Superior Tube Company, Philadelphia, Pa., a corporation of Pennsylvania Application February 10, 1949, Serial No. 75,577

7 Claims. (Cl. 29—25.2)

This invention relates to the manufacture of cathodes for thermionic tubes and has particular reference to the disc type of cathode which is used in various cathode ray tubes, television pickup tubes, and tubes of so-called lighthouse construction.

In tubes of the types just mentioned the thermionic emission is obtained from a relatively small, flat disc coated with alkaline earth oxides. These discs are supported by a metal tubular member which may be of any of the conventional forms, i. e., seamless or of lockseam, welded, welded and drawn, boxed, or wrap-around ribbon type, and also serves as a means of conducting heat to the disc or cup carrying the oxides to heat it to electron-emitting temperature. An insulated tungsten, molybdenum or similar wire is usually placed inside the tube to provide sufficient heat by electrical resistance to make possible attainment of the proper temperature.

In order to support the cathode assembly ceramic or similar heat resistant insulators are employed. Heretofore the tubular member has been held in place in various fashions, for example, by the use of two collars carrying flanges, the collars being welded on the tube at each side of the insulator, by providing an embossing or bead on the tube on one side of the insulator and providing a collar having a flange on the other side, or by providing a bead on the tube on one side of the insulator and providing on the other side a deep drawn cathode cap with a flange engaging the insulator. These constructions are expensive and require an undue amount of handling and welding, and in the case of use of deep drawn cathode caps there is a limitation, due to the drawing, on the metals which may be used.

It is an object of this invention to mount the ceramic insulating disc on the tube by simultaneously embossing the tube on each side of the disc.

Another object of the invention is to mount the ceramic disc squarely and firmly on the tube, accurately positioned with respect to the ends of the tube.

It is a further object of the invention to provide automatic means for feeding the ceramic disc, feeding a definite length of the tube through the ceramic disc, embossing the tube on each side of the disc, cutting off the tube and disc assembly, and automatically repeating the sequence.

These and other objects of the invention will become apparent from the following description, read in conjunction with the accompanying drawings, in which:

Figure 3 is a perspective view of the back of the portion of the machine embodying the disc feed and tube forming mechanisms;

Figure 4 is a back view showing in elevation the portion of the machine embodying the disc tube forming mechanisms;

Figure 5 is a vertical axial section of the mechanism shown at the upper left hand portion of Figure 4;

Figure 6 is a vertical axial section of another portion of the mechanism shown in Figure 4;

Figures 7 and 8 are sections taken on the plane indicated at 7—7 in Figure 1 showing the relation of certain elements of the machine during different stages of operation; and Figures 9 and 10 are plan views, partly in section, of the portion of the machine indicated at 10 in Figure 1 showing the relative positions of certain elements of the machine during different stages of operation.

Figure 1:
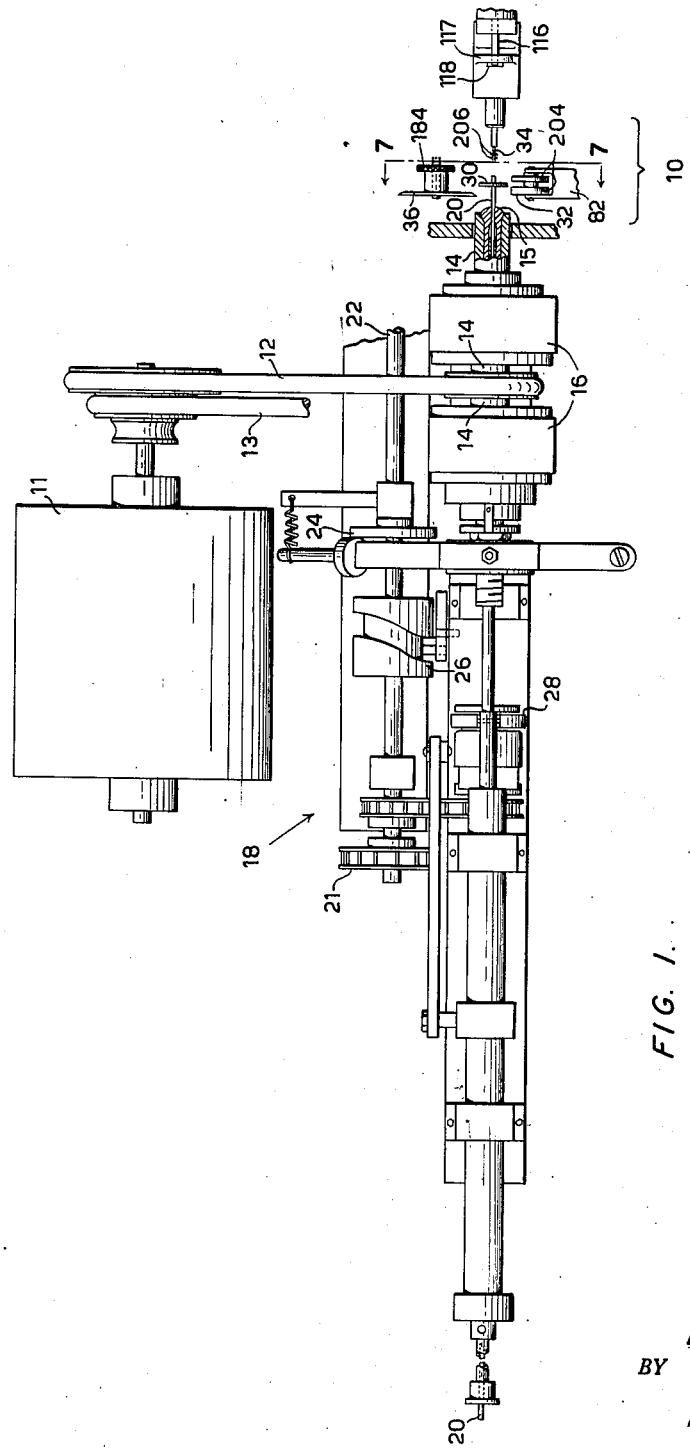
Figure 1 is a plan view of the portion of the machine embodying the tube feed mechanism.

Referring to Figure 1 there is a motor drive element 11 supplying driving power by means of belt 12 to shaft 14 which is mounted in bearing housings 16 and contains the tubular element 20. It will be evident that the mechanism shown generally at 18 is that described in detail in the patent to A. A. Pruckner, 2,248,720, issued July 8, 1941, which, by the operations of cams 24, 26 and 28 as fully described therein, causes the tube 20 to be fed to the right for a distance adjustable by the positions of the cam levers and at a particular time relative to the position of cam shaft 22. The tube 20, when not being fed, is held in position by the action of chuck 15. The cam shaft 22 is driven by the motor 11, through belt 13, shafting, not shown, and the chain 21, as is fully described in the above mentioned patent to A. A. Pruckner. The shaft 22 rotates once in each cycle of operation of the machine. The shaft 14 and the tube 20 are rotating at a high rate of speed with respect to the speed of rotation of the cam shaft 22 during the interval of tube feed as well as between tube feed intervals.

At the right hand portion of Figure 1 there is shown the tube 20, tube mounting chuck 15, ceramic disc 30, guide roller 32, spinning nib 34 and cut-off disc 36. The mechanisms controlling the motions and operations of these parts will now be described in detail.

Referring to the figures, the disc magazine 40 contains ceramic discs 30', similar to disc 30, which may be fed into the top of the magazine either manually or by conventional automatic feeding means. The disc magazine 40 is mounted on members 39 and 41 which are slidably mounted in slots 43 and 45 of the disc magazine mounting member 37. The lowermost position of the magazine is adjustably limited by means of screw 42, which bears against stop 44, so that the lowermost disc contained in the magazine is positioned with its center hole in proper alignment with the tube 20 as shown in Figure 7 to allow the entrance of the tube into the disc as will be hereinafter described in greater detail. The disc magazine 40 is raised by the action of cam 46 acting through cam follower 47 and connecting members 48, 50 and 52 providing the clearance necessary to permit the guide roller 32 to move into position as shown in Figure 8.

At the lower end of the disc magazine are spring leaf members 54 which deflect outwardly and allow the lowermost disc to remain in position on the tube 20 when the disc magazine is raised by the action of cam 46. The spring leaf members 54 return to their normal position when the lower disc has been withdrawn thus retaining and properly positioning the next disc for the next disc feed operation. When the rise of the cam 46 has passed the cam follower 47 the disc magazine will, by its own weight, return to the lowermost position as determined by the setting of screw 42. It will be noted that the portion of cam shaft 22 mounted in bearings 37 and 38 and carrying various cams is a continuation of that shown in Figure 1 which rotates one revolution for each cycle of operation of the machine and controls the operation of tube feed.

Also mounted on cam shaft 22 is bevel gear 58 driving bevel gear 60 which is mounted on cross shaft 62. On the opposite end of cross shaft 62 there is mounted bevel gear 64 in engagement with bevel gear 68 which, in turn, drives cam shaft 70 which makes one revolution for each revolution of shaft 22. Mounted on cam shaft 70 is cam 72 which, acting through cam follower 74 and lever 76, advances the carriage 78 which is mounted on the base plate 77. Mounted on the carriage 78 is the carrying member 80 and carrying arm 82 in which, in turn, is mounted the pin 83 carrying the guide roller 32. There is provided an adjusting screw 84 which serves to move carrying member 80 longitudinally with respect to carriage 78 in order to provide the longitudinal adjustment required to properly align the guide roller 32 with the disc 30 to permit engagement of the disc 30 within the slot 208 of the roller as shown in Figure 9. The transverse position of the guide roller can be adjusted by changing the position at which carrying arm 82 is mounted on carrying member 80 in order that, when the guide roller is in engagement with the disc, the faces 204 of the guide roller will contact the tube 20. The guide roller when contacting the rotating tube 20 will rotate about pin 83; thus there will be a minimum of scuffing between the guide roller 32 and the tube 20 and the disc 30. The cam follower 74 is at all times held firmly against the cam 72 by the action of spring 86.

Also mounted on cam shaft 70 is a bevel gear 88 which drives bevel gear 90 and shaft 92 which passes through member 100 and on which is mounted cam 94.

Slidably mounted within guide members 96 and 98 of member 100 is a tubular shaft 102. Rigidly affixed to shaft 102 are members 104 and 108. Rotatably mounted within the bores 110 and 112 of members 104 and 108, respectively, is shaft 114 on one end of which is mounted eccentric pin 116 in engagement with the forked member 117. Member 117 is pivotally mounted on pin 118 which is affixed to member 119.

Mounted on cam shaft 22 is sprocket 120, mounting the chain 122 which drives sprocket 124. Sprocket 124 is affixed to sleeve member 126 which is rotatably mounted in bearing housing 130. The sprocket 124 is held in proper alignment with sprocket 120 by the action of the collar 128, which is affixed to the sleeve 126, and sprocket gear 124, each bearing against opposite sides of bearing housing 130. Slidably mounted within the sleeve 126 and splined thereto by elongated key 132 is shaft 134. Rigidly mounted on the shaft 134, which is also slidably mounted within bearing housing 136, is the cam 138 and member 140. The lower end of member 104 is embraced by, and rotatably mounted on, member 140.

Also mounted on member 104 is bearing mount 142 carrying pin 144 on which is mounted arm 148. Mounted on one end of arm 148 is cam follower 150 bearing against cam 138, and connected to the other end of the arm by pin 151 is connecting link 152 which is connected to the arm 160 by pin 161. The arm 160 is, in turn, rigidly connected with shaft 114. The cam follower 150 is held firmly against the cam 138 by the action of spring 149 working between lever 148 and the member 104.

The assembly of the parts associated with members 102, 117 and 119 is shown in Figures 5 and 6. Member 162 is affixed to member 102 by set screw 159, and retained between member 162 and guide member 96 is spring 164. Rod 166 is keyed within the central bore of member 102 by key 168 allowing longitudinal motion but preventing rotation between the member 102 and the rod 166. Mounted to the left-hand end of rod 166 is the micrometer head 170. The micrometer head 170 is threaded, and, as shown at 172, is engaged with the threaded interior of member 102.

The screws 174, which provide a mounting for the micrometer head 170 on rod 166, allow the micrometer head to rotate with respect to the rod but carry the rod longitudinally with the head as the head screws into or out of the member 102. The edge 163 of the member 162 bears resiliently against the knurled surface 171 of the micrometer head 170 thus locking the head in any position in which it is set.

The member 119 is rigidly mounted on the right-hand end of rod 166 by set screws 176. Pivotally mounted to member 119 by pin 118 is member 117. Member 177 is mounted in bearings 178 within member 117 and receives spinning nib 34 which is held in place by set screws 179.

Cut-off disc 36 is rotatably mounted on shaft 180. The shaft 180 is screwed into support arm 182 and locked in position by jam nut 184. Thus there is provided longitudinal adjustment of the position of the cut-off disc. Support arm 182 is mounted in carriage 186, which is slidably mounted on member 188. The relative positions of carriage 186 and member 188 may be adjusted by screw 187 which serves to adjust the point of furthermost inward travel of the cutting disc when it is in the position of cutting the tube 20 as will be hereinafter described. Cam 196 is rigidly mounted on shaft 22. On mounting bracket 190 is pivotally mounted lever member 192, one end of which supports cam follower 194 running on cam 196 and the other end of which is connected to member 188 by means of the link 198. The member 188 is slidably mounted in base plate 189. The cam follower 194 is held firmly against the cam 196 by the action of spring 200 working between bracket 190 and lever 192.

The sequence of operations of the machine may now be reviewed. With the cam shaft 22 in the position as shown, the tube 20 has been fed through the center hole in the lowermost disc in the disc magazine 40, by the mechanism shown generally at 18 in Figure 1, as disclosed in the above mentioned patent to A. A. Pruckner. While the extent to which the tube is fed through the disc is controlled by the feeding mechanism, there is also provided a stop member 202 which serves as a gauge as well as a stop to insure the existence of an accurate length of tube beyond the disc 30. After the completion of the tube feed operation, the rise of the cam 46 passes under the cam follower 47 raising the members 48, 50, 52, and the disc supply magazine 40 from the position shown in Figure 7 to the position shown in Figure 8. The lowermost disc 30 through which the tube 20 has been inserted is drawn from the magazine past the spring clips 54 which spring back into position preventing the succeeding discs from dropping out of the magazine.

It will be noted that cam 72 actuating the guide roller 32 and cam 94 which gives longitudinal motion to the member 102 and the assembly mounted thereon including the spinning nib 34, are in positions similar to that of cam 46. Thus, as the disc supply magazine is raised, the guide roller mounting assembly is moved inwardly by the action of member 76, and the guide roller 32 engages the disc 30 as shown in Figures 8 and 9. At the same time the spinning nib 34 is moved longitudinally inwardly into the tube 20, from the position shown in Figure 10, to the position shown in Figure 8 and then brought to bear against the wall of tube 20, in the following manner:

The cam 94 bearing on cam follower 106 moves the member 104 to the right, as viewed from the back of the machine in Figures 3 and 4. Member 102 which is affixed to member 104 moves in the guides 96 and 98 carrying with it members 108, 119 and 117 and compressing spring 164 between the guide 96 and member 162. Member 104 is retained by, and rotatably mounted on, member 140 which is fixed to shaft 134. When member 104 is moved to the right in Figures 3 and 4 by the action of cam 94 or moved to the left by the action of spring 164 when the rise in the cam has passed the cam follower, member 140 carries with it shaft 134 which slides longitudinally within sleeve 126 and bearing member 136. While the amount of travel of the spinning nib 34 is determined by the cam rise, the exact position assumed by the nib may be adjusted by screwing the micrometer head 170 into or out of the member 102 thus moving the rod 166 longitudinally with respect to member 102 and carrying with it members 119, 117 and the nib 34. By use of the micrometer head adjustment the beads 206 of the spinning nib may be positioned longitudinally exactly with respect to the bevel edges 212 of the groove 208 in the guide roller as shown in Figure 9.

Immediately following the completion of insertion of the nib 34 into the tube 20, the rise of the cam 138 moves under the cam follower 150 actuating members 148, 152, 160, 114 and 116, causing member 117 to pivot on pin 118 and impart to the spinning nib a transverse motion causing it to assume an off-center position within the tube 20 such as is shown in Figure 9. The member 177, in which the spinning nib is mounted, is carried by bearings 178; thus, the nib will rotate freely as soon as the nib beads 206 contact the interior of the rotating tube 20. The peripheral surfaces 204 of the guide roll 32 bear against the tube 20 providing restraint for the action of the beads 206 of the spinning nib 34 which bear against the inside of tube 20. The ceramic disc 30 meshes with the slot 208 in the guide roll 32 and is thereby held squarely in position on the shaft 20, while the beads on the spinning nib form the beads 210 on the tube on either side of the ceramic disc. It will be noted that the edges of the groove 208 are bevelled at 212 to allow for the formation of the beads 210 which result from the action of the beads 206 on the spinning nib bearing on the inside of the tube 20 and serve to mount the disc 30 rigidly on the tube 20 and at precise right angles thereto.

Figure 2:
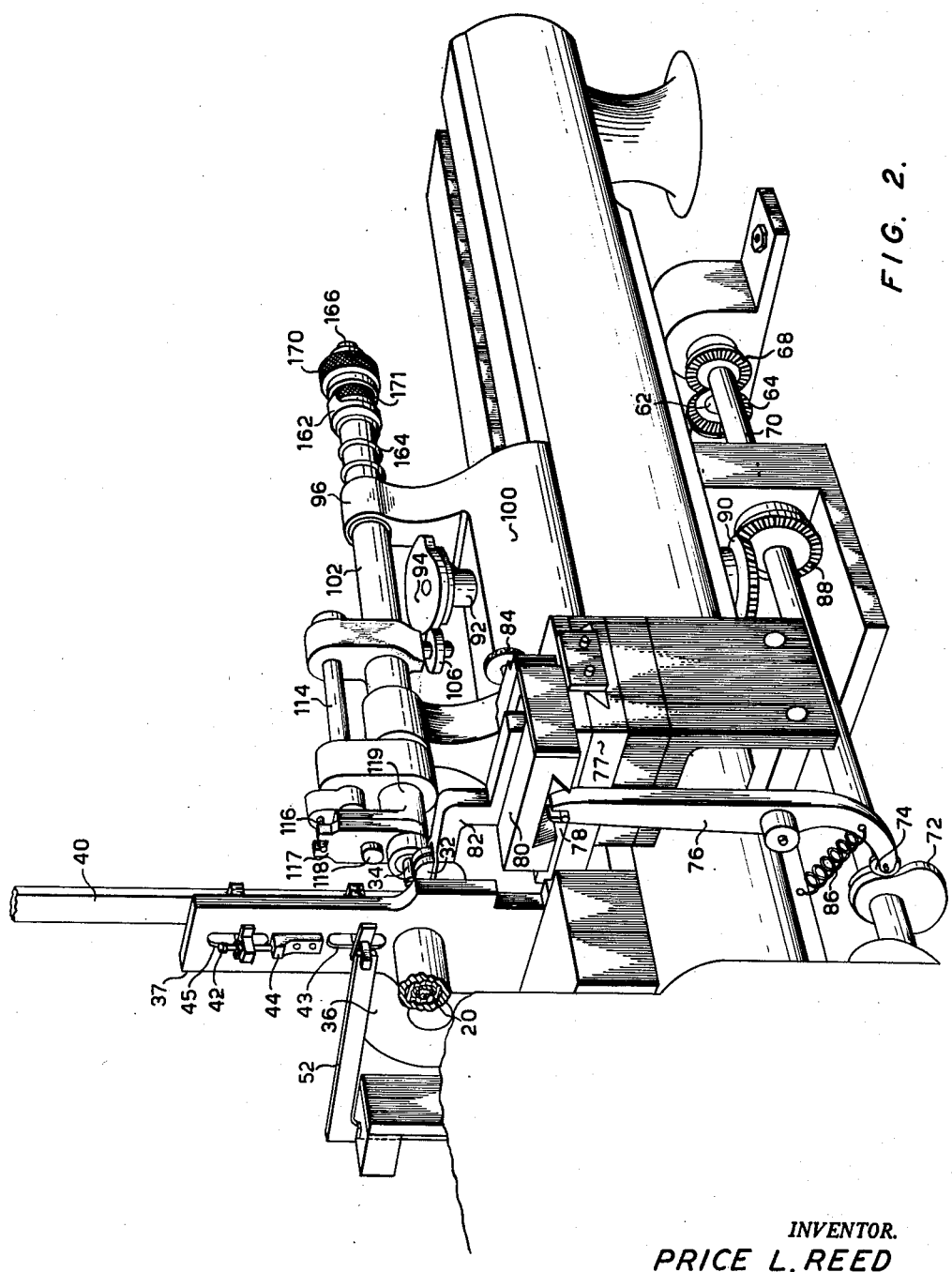
Figure 2 is a perspective view of the front of the portion of the machine embodying the disc feed and tube forming mechanisms.

As the bead spinning operation comes to completion, the cam 196 causes the cut-off disc 36 to move inwardly and contact the tube 20. The cut-off disc, being rotatably mounted on member 180, will rotate as a result of its contact with rotating tube 20 and commence cutting the tube in the manner of a conventional tube cutting disc. The exact length of tube remaining between the disc 30 and the point of cut-off by cut-off wheel 36 is adjusted by moving the threaded member 180 with respect to the support arm 182. The surface of the rise of the cut-off disc actuating cam 196 is constructed with a progressively increasing radial dimension in order that, while the cutting takes place, the cut-off disc is gradually moved inwardly in order that, as the tube is cut, the force of the cut-off wheel bearing on the tube is approximately uniform. Following the inward motion of the cut-off disc, the cam follower 150 drops from the rise of the cam 138 moving the spinning nib longitudinally to a central position within the tube 20 after which cam follower 106 drops from the rise of the cam 94 allowing the spring 164 to draw the shaft 102 and the assembly mounted thereon longitudinally backward, thereby drawing the spinning nib out of the tube and returning it to a position as shown in Figure 2. Simultaneous with this withdrawal of the spinning nib the guide roller is retracted to a position clear of the ceramic disc as is also indicated in Figure 10 after which cut-off disc 36 completes the cut allowing the severed tube and disc assembly to drop from the machine into a receptacle (not shown) provided therefor.

It will be noted that a bead spun circumferentially in a tube by the rotation of the tube about a point must be in a plane perpendicular to the longitudinal axes of the tube. Thus when two beads are spun simultaneouly in a tube so as to bear upon either side of a member mounted thereon the member, in this case the ceramic disc, will be mounted not only firmly but also squarely on the tube.

By means of the cut-off disc which is operated in conjunction with the other mechanisms involved, the length of the tube, associated with the disc when the tube and disc assembly is cut from the tube held by the machine, is maintained to a very accurate degree.

After the tube and disc assembly is removed from the present machine, it is set in a die and struck to close the beads on each side of the disc, thereby further assuring a permanent rigid mounting for the disc. This operation is more fully described in the copending application of Thomas H. Briggs, Jr., Serial No. 75,845, filed February 11, 1949. In my Patent No. 2,476,454, issued July 19, 1949, there is disclosed the method and apparatus for gaging and welding the cathode cap in position on one end of the tube.

The present invention accomplishes both the mounting of the disc and the accurate cut-off of the tube both rapidly and automatically thereby insuring a maximum uniformity of finished product and eliminating all the handling formerly required in the manufacture of the types of assembly heretofore employed.

What I claim and desire to protect by Letters Patent is:

1. Apparatus for mounting an element on a tubular member comprising means rotating said tubular member, guiding means including means for positioning said element longitudinally on said member, bead forming means, and means bringing said bead forming means to bear on the inside of the wall of said member on opposite sides of said element, said guiding means also including means for supporting said member against the action of the forming means, the beads formed in said member by the forming means providing a mounting holding said element perpendicular to the longitudinal axis of the tubular member.

2. Apparatus for mounting an element on a tubular member comprising means supporting said tubular member, guiding means including means for positioning said element longitudinally on said member, bead forming means, and means bringing said bead forming means to bear on the inside of the wall of said member on opposite sides of said element, said guiding means also including means for supporting said member against the action of the forming means, the beads formed in said member by the forming means providing a mounting for said element on said tubular member.

3. Apparatus for mounting an element on a tubular member comprising means supporting said tubular member, means for positioning said element, means feeding said member through an aperture in said positioned element, bead forming means, means inserting said bead forming means into said member and bringing the forming means to bear on the inside of the wall of said member on opposite sides of said element, guiding means supporting said member against the action of the forming means, the beads formed in the wall of said member by the forming means bearing against each side of said element mounting it on said tubular member, and means for cutting off a length of said member after said element is mounted thereon.

4. Apparatus for mounting an element on a tubular member comprising means rotating said tubular member, means for positioning said element, means feeding said member through an aperture in said positioned element, bead forming means, means inserting said bead forming means into said member and bringing the forming means to bear on the inside of the wall of said member on opposite sides of said element, guiding means supporting said member against the action of the forming means, the beads formed in the wall of said member by the forming means providing a mounting holding said element perpendicular to the longitudinal axis of the tubular member, and means for cutting off a length of said member after said element is mounted thereon.

5. Apparatus for mounting an element on a tubular member comprising means mounting said tubular member, guiding means positioning said element longitudinally on said member, bead forming means, means rotating said mounting means and said member, and means bringing said bead forming means to bear on the inside of the wall of said member on opposite sides of said element, the beads formed in said member by the forming means providing a mounting holding said element perpendicular to the longitudinal axis of the tubular member.

6. Apparatus for mounting an element on a tubular member comprising means supporting and rotating an extended length of said tubular member, guiding means positioning said element longitudinally on said member adjacent one end thereof, bead forming means, and means entering said bead forming means in said one end of said member and bringing said bead forming means to bear on the inside of the wall of said member on opposite sides of said element, the beads formed in said member by the forming means providing a mounting for said element on said tubular member.

7. Apparatus for the mounting of an apertured element on a tubular member comprising means for guiding said element and temporarily holding it in a predetermined position, means for feeding lengthwise a predetermined length of tubing through the aperture in the positioned element, bead forming means comprising a spindle provided with a pair of beading flanges, a second guiding means constructed and arranged to embrace said element and to bear upon the exterior of said tube, means for withdrawing said first mentioned guiding means to release said element after said tubing has been fed through the element, means for moving said second guiding means to embrace said element to retain it in a predetermined position lengthwise of the portion of tubing extending through its aperture, means for rotating said tubing, means for inserting said bead forming means within said tubing and for causing said beading flanges to press against the interior of said tubing on opposite sides of said element to produce, in conjunction with said external guiding means and during rotation of said tubing, a pair of beads to mount said element on the tubing at right angles to the tubing, means for cutting off a length of said tubing to provide said tubular member, means for moving the cut-off means into engagement with said tubing, means for withdrawing said bead forming means from said tubing after beads are formed therein, and means for withdrawing said external guiding means from engagement with said tubing after beads are formed therein.

PRICE L. REED.

REFERENCES CITED

The following references are of record in the file of this patent:

UNITED STATES PATENTS

| Number | Name | Date |
| --- | --- | --- |
| 567,328 | Warman et al. | Sept. 8, 1896 |

FOREIGN PATENTS

| Number | Country | Date |
| --- | --- | --- |
| 22,185 | Great Britain | Oct. 8, 1906 |